(12) United States Patent
Lehmann et al.

(10) Patent No.: US 10,368,063 B2
(45) Date of Patent: Jul. 30, 2019

(54) OPTICAL TEST DEVICE FOR A VEHICLE CAMERA AND TESTING METHOD

(71) Applicant: MAGNA ELECTRONICS INC., Auburn Hills, MI (US)

(72) Inventors: Norbert Lehmann, Kelkheim (DE); Michael Junglas, Elsenfeld (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/953,880

(22) Filed: Apr. 16, 2018

(65) Prior Publication Data

US 2018/0302615 A1  Oct. 18, 2018

Related U.S. Application Data

(60) Provisional application No. 62/486,072, filed on Apr. 17, 2017.

(51) Int. Cl.
| | |
|---|---|
| *G06K 9/00* | (2006.01) |
| *H04N 17/00* | (2006.01) |
| *H04N 5/217* | (2011.01) |
| *H04N 5/225* | (2006.01) |

(52) U.S. Cl.
CPC ....... *H04N 17/002* (2013.01); *G06K 9/00805* (2013.01); *H04N 5/2178* (2013.01); *H04N 5/2253* (2013.01); *B60R 2300/105* (2013.01)

(58) Field of Classification Search
CPC .. H04N 17/002; H04N 5/2178; H04N 5/2253; G06K 9/00805; B60R 2300/105
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,043,821 A * | 3/2000 | Sprague | G06T 15/503 |
| | | | 345/561 |
| 2007/0297749 A1 | 12/2007 | Ain et al. | |
| 2008/0284880 A1* | 11/2008 | Numata | H04N 5/217 |
| | | | 348/241 |
| 2008/0315865 A1 | 12/2008 | Doogue et al. | |
| 2009/0323232 A1 | 12/2009 | Suzuki et al. | |
| 2010/0045268 A1 | 2/2010 | Kilian | |
| 2013/0154660 A1 | 6/2013 | Bucsa et al. | |
| 2015/0039913 A1 | 2/2015 | Sugiyama et al. | |
| 2015/0048798 A1 | 2/2015 | Godo et al. | |

(Continued)

*Primary Examiner* — Michael E Teitelbaum
(74) *Attorney, Agent, or Firm* — Honigman LLP

(57) ABSTRACT

A method of testing a camera for vision system for a vehicle includes providing a camera configured for mounting and use on a vehicle. The camera is operable at selected ones of a plurality of register settings. A test pattern is disposed in the field of view of the camera and at least two frames of image data are captured with the camera using different register settings having noise filtering at a respective one of at least two levels between a maximum noise filtering and a minimum noise filtering. The signal to noise ratio is measured for each of the at least two frames of captured image data. A texture value is measured for each of the at least two frames of captured image data. A compromise is selected between noise reduction and texture preservation.

20 Claims, 22 Drawing Sheets

(56) References Cited

U.S. PATENT DOCUMENTS

| | | |
|---|---|---|
| 2016/0086317 A1* | 3/2016 | Oron .................. G06T 5/002 |
| | | 382/275 |
| 2016/0245869 A1 | 8/2016 | Asako |
| 2017/0006282 A1 | 1/2017 | Sigle |
| 2017/0234923 A1 | 8/2017 | Douglas et al. |

* cited by examiner

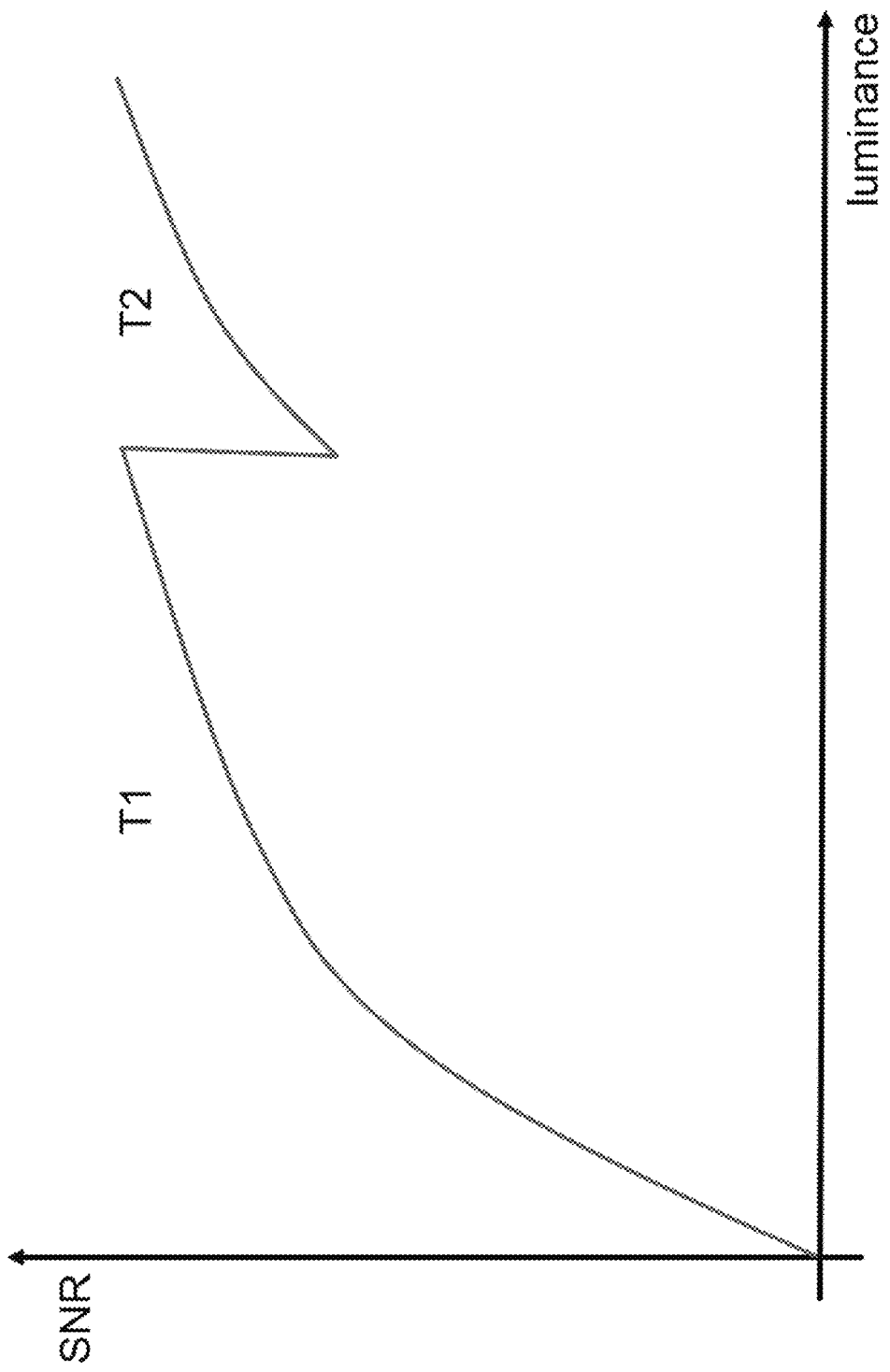

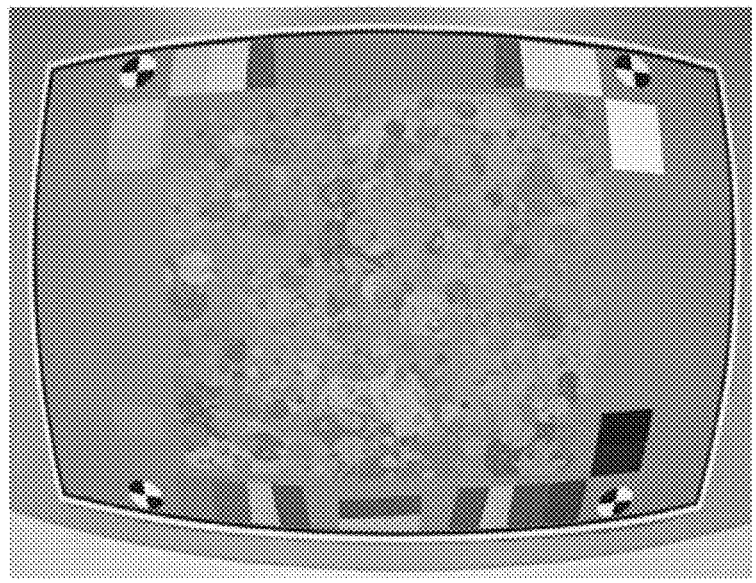
FIG. 7A
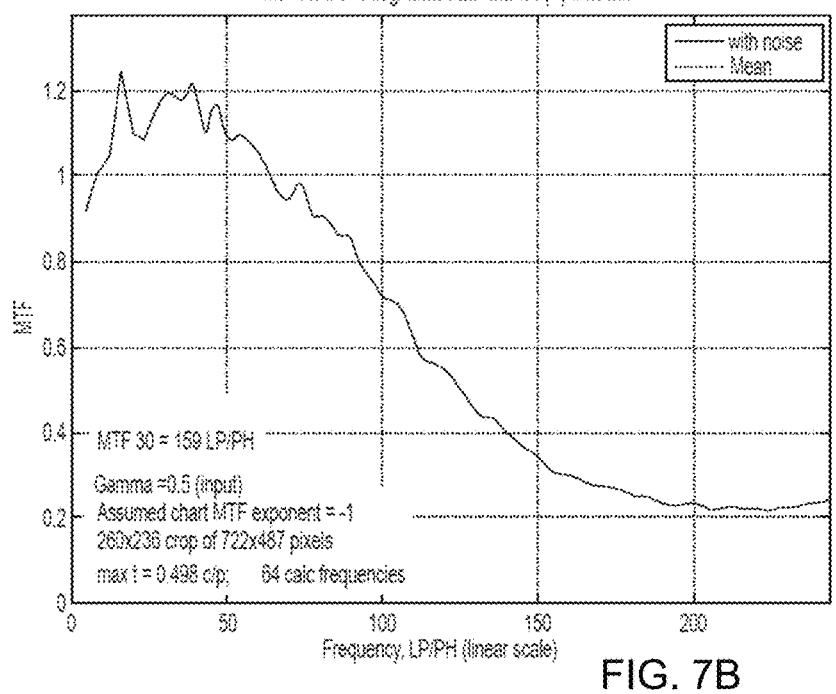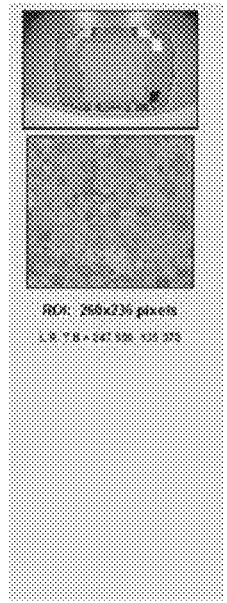
FIG. 7B

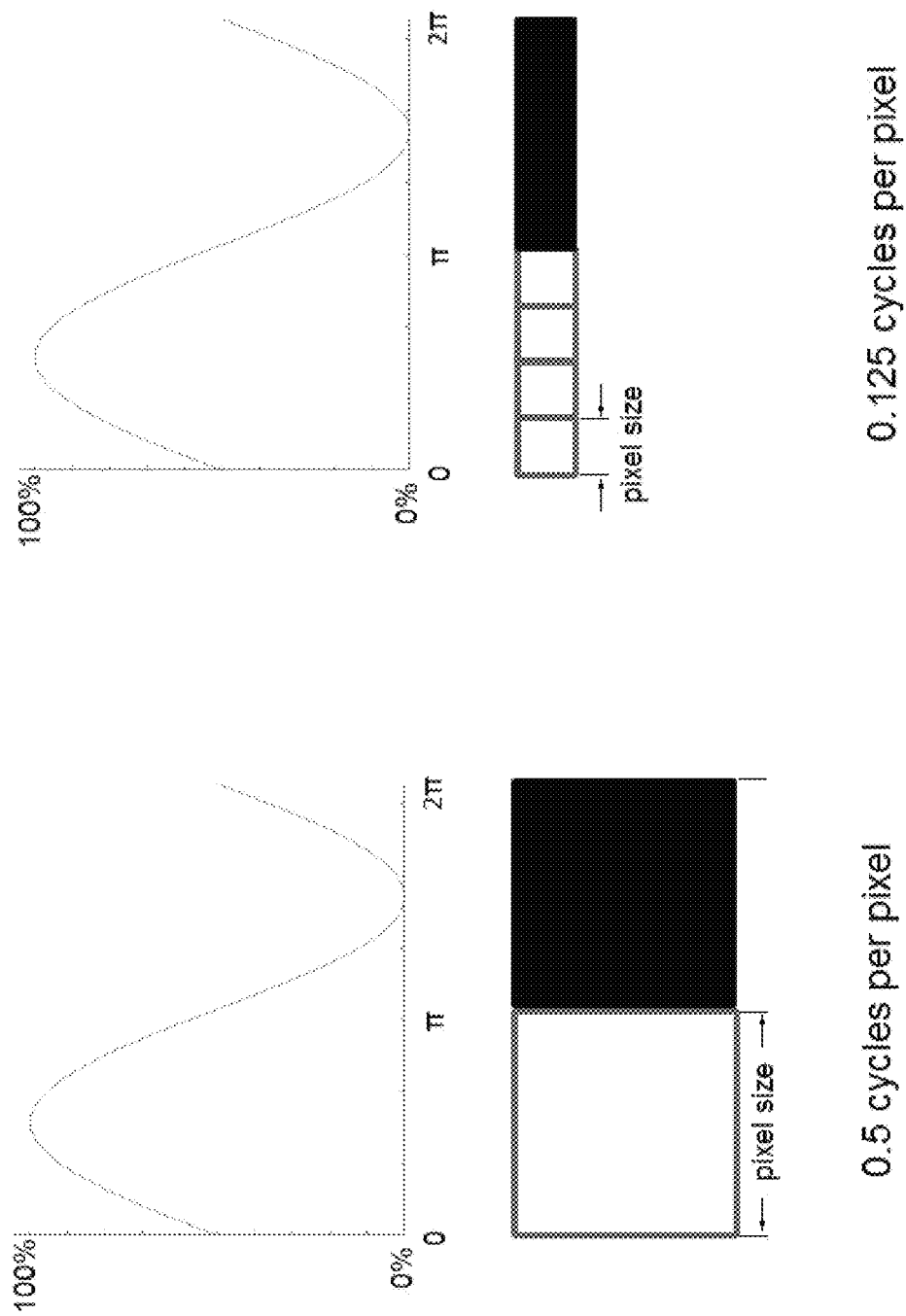

| Name | DeNoise ADACD | T2-ADACD |
|---|---|---|
| Axel | 7 | 1023 |
| Bernd | 7 | 900 |
| Carlo | 6 | 800 |
| Dick | 6 | 700 |
| Ernst | 5 | 600 |
| Felix | 4 | 500 |
| Gretel | 4 | 450 |
| Hugo | 3 | 352 |
| Ida | 3 | 250 |
| Karl | 2 | 160 |
| Ludwig | 1 | 100 |
| Martha | 1 | 80 |
| Nemo | 0 | 40 |
| Oswin | 0 | 10 |
| Peter | off | off |

FIG. 10

OPTICAL TEST DEVICE FOR A VEHICLE CAMERA AND TESTING METHOD

CROSS REFERENCE TO RELATED APPLICATION

The present application claims the filing benefits of U.S. provisional application Ser. No. 62/486,072, filed Apr. 17, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or U.S. Pat. No. 5,550,677, which are hereby incorporated herein by reference in their entireties.

SUMMARY OF THE INVENTION

The present invention provides a testing system for a camera for a driver assistance system or vision system or imaging system for a vehicle. The testing system or method processes multiple frames of image data captured by the camera with a test pattern in the camera's field of view, and with the multiple frames of image data being captured using different register settings between maximum and minimum noise filtering. The image processing measures the signal to noise ratio of at least two frames of captured image data, and measures the texture KPI (key performance indicator), whereby the system selects a best compromise between noise and texture preservation.

These and other objects, advantages, purposes and features of the present invention will become apparent upon review of the following specification in conjunction with the drawings.

BRIEF DESCRIPTION OF THE DRAWINGS

FIG. 3 is a chart showing signal to noise ration vs. luminance;

FIG. 7A is another captured image with poorer texture preservation;

FIG. 7B is an MTF curve of the captured image of FIG. 7A, showing lacking in middle and high frequencies captured by the camera;

FIGS. 8A and 8B are graphs showing processing of different frequencies or pixel pitch;

FIG. 10 is a list of various de-noising register settings for use in the testing method;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
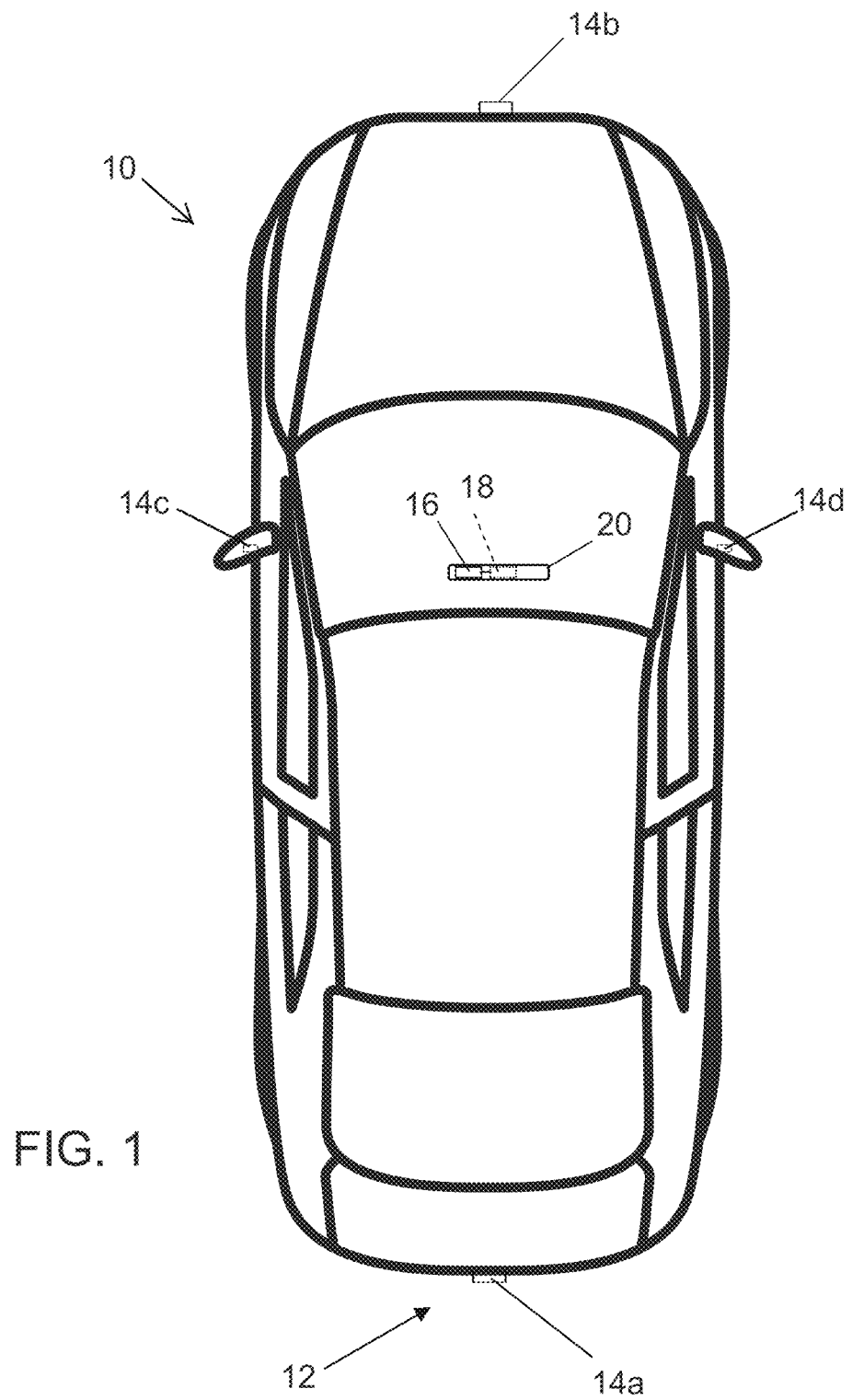
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In the automotive field there are forward vision and rearward vision cameras with normal view lens systems, surround view vision cameras (forward, sideward, rearward) with fish eye optics, and mirror—blind spot cameras with >f-theta lens optics in use. Compared to consumer SLR (single lens reflex)—cameras and smart phone cameras, such automotive camera's imagers have a low resolution (pixel wise) while the imager dimensions are not much larger in comparison. The dimension relates to the noise tendency. The noise also increases with the imager's temperature. Typically, the noise increases with diminishing light, since the imager then has to increase the analog and digital amplification, which also causes an amplification of the noise. Besides other subjective quality measures, the image sharpness and the image noise are substantial image quality measures, especially for human vision. Some image noise filter made for suppressing stochiastic noise show the tendency to blur image texture. Typically, this is not very visible when having strong filtering at low light.

Figure 2A:
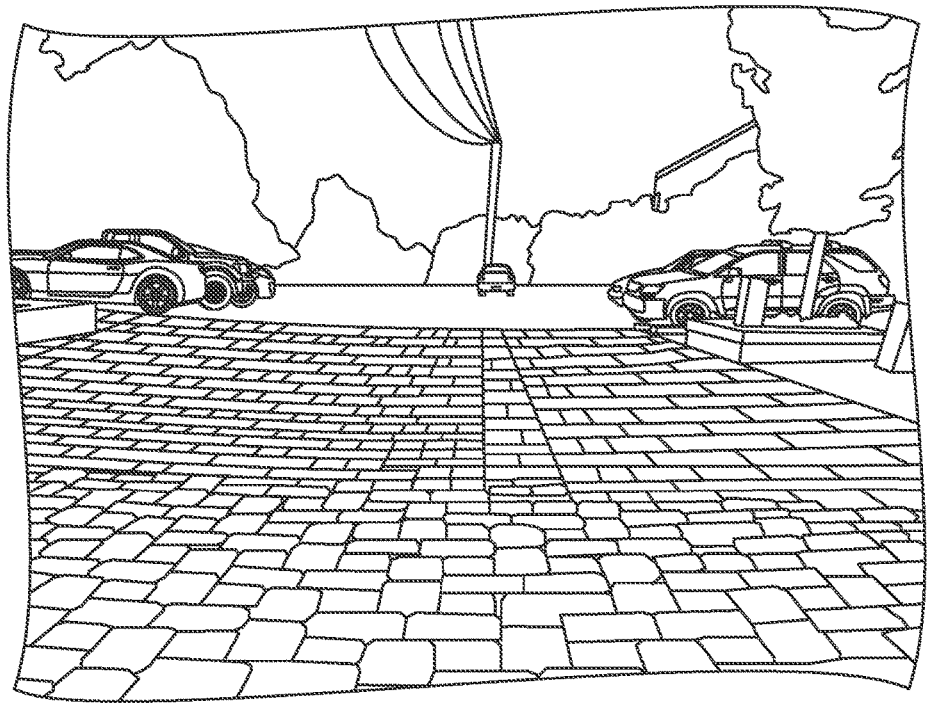
FIG. 2A is an image captured by a camera shown without texture loss.
Figure 2B:
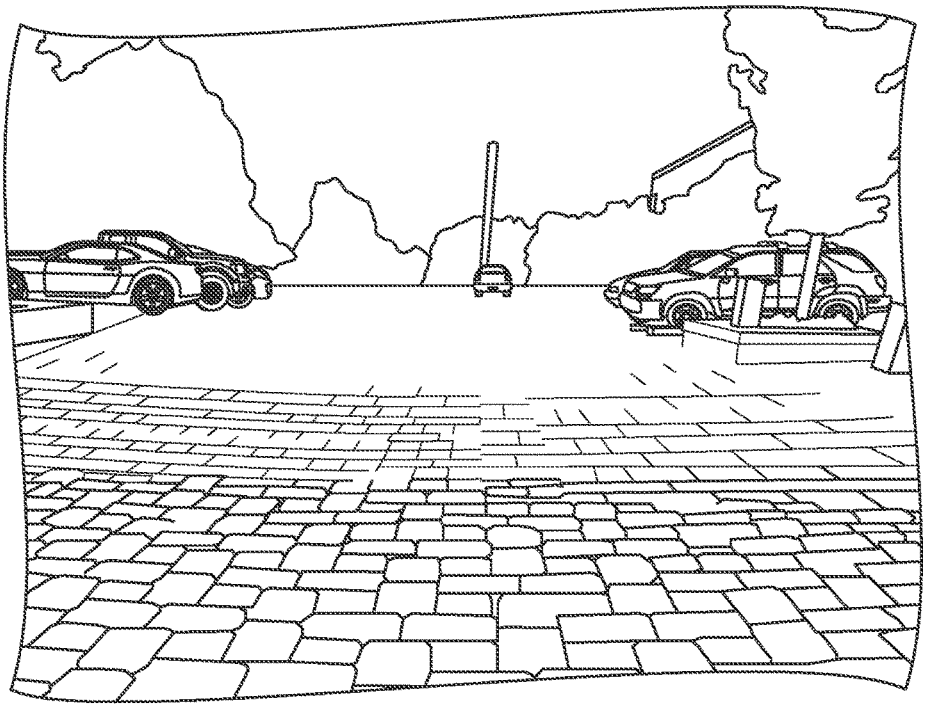
FIG. 2B is an image captured by a camera shown with texture loss at bright light lighting conditions caused by conventional HDR (High Definition Resolution) imager noise filtering.

When using a High Dynamic Range (HDR) automotive camera imager with two or more exposure times (for increasing the common dynamic range of imager's with typically less range), the texture loss is also visible at bright light when the noise filter parameter are chosen suboptimal to the image scene's dynamic and scene's over all brightness. FIG. 2B shows an example of texture loss at bright light lighting conditions caused by conventional HDR imager noise filtering. FIG. 2A shows the desired image (having the same resolution as FIG. 2B), without texture loss. The pavement stone's seams are visible up to the distance where the asphalt begins in FIG. 2A, while they are lost at the second third of the image of FIG. 2B. FIG. 2A shows powerline cables at the top center during these are not visible in FIG. 2B. The texture loss produced by conventional HDR imager noise filtering (with standard register settings) occurs by having a non-continuous Signal to Noise Ratio (SNR) increase by increasing illuminance (of the captured scene), since the HDR images comprise multiple images or image frames captured shortly after one another with different shutter times. Due to different shutter times, the amplification also varies which also amplifies the noise. In disadvantageous combinations, this results in increased noise also in comparably bright conditions. This is where the SNR abruptly drops in the diagram of FIG. 3.

Figure 4:
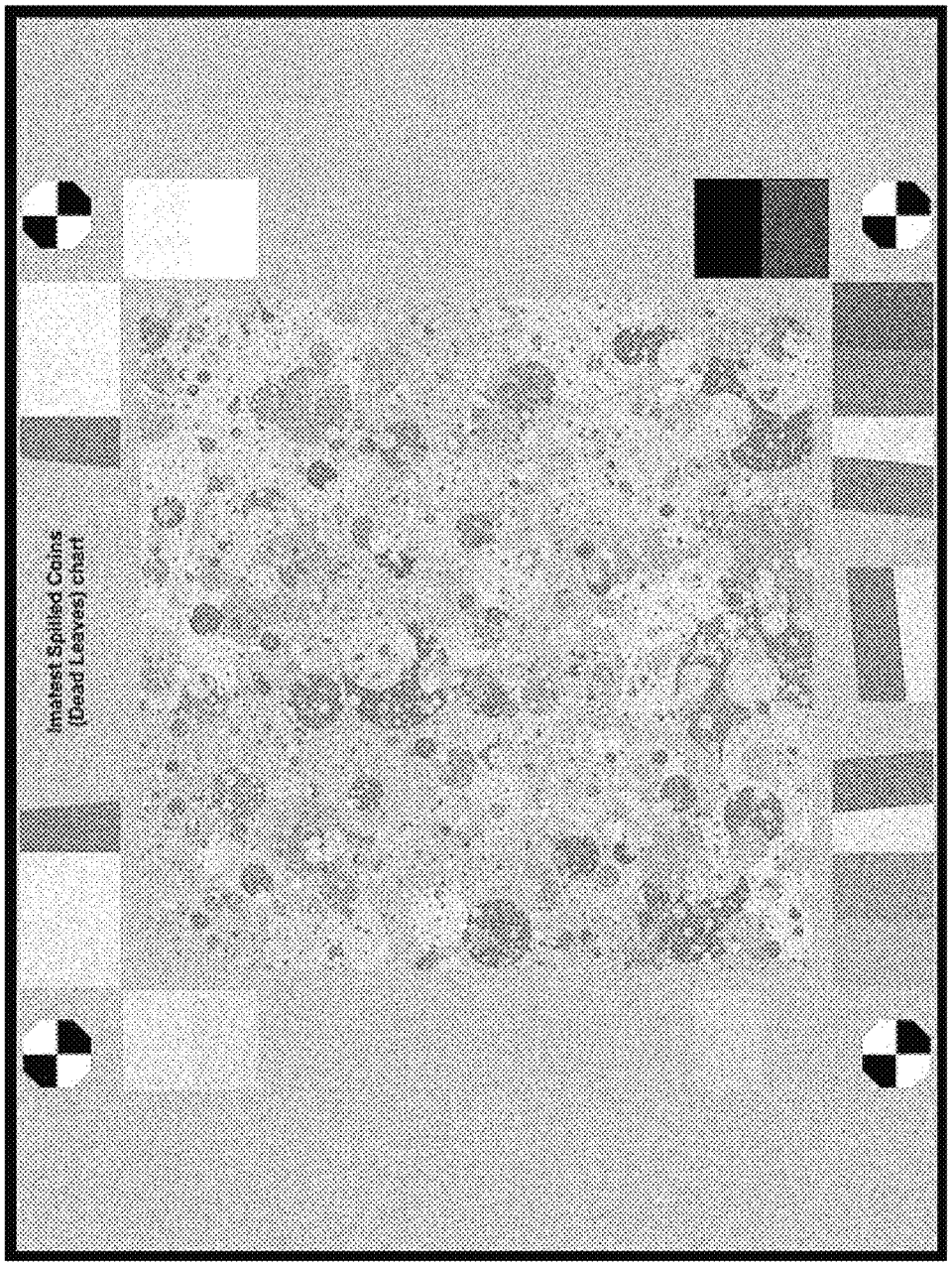
FIG. 4 is an example of a dead leaves texture pattern.

For measuring common digital camera sharpness, texture patterns, such as shown in the chart of FIG. 4 called Dead Leaves, may be used. These charts show low contrast changes between overlapping circles/no straight lines, which leads to a good Modulation Transfer Function (MTF) comparison insensitive to digital sharpening. It turns out these chart patterns are now more prominent for the measurement of noise filtering effects that are the converse argument of so called "Texture Preservation".

Figure 5:
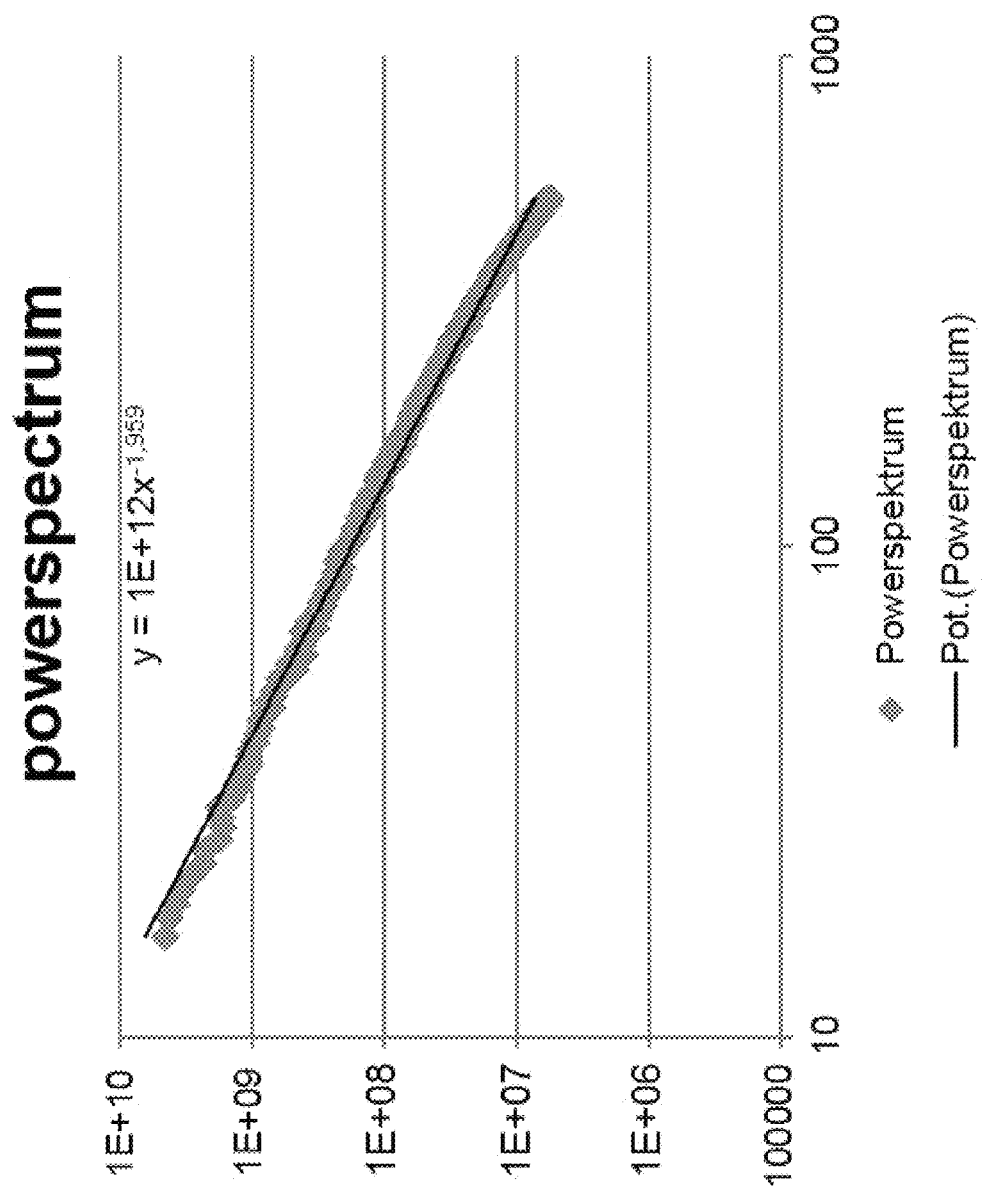
FIG. 5 is a chart showing frequency power spectrum.

Leaves Charts may these be colored or colorless (black and white or grayscale) as shown in FIG. 4, and possess a frequency power spectrum, such as shown in FIG. 5. When capturing images of these charts by a camera under test (by using a sufficient size ratio that equates to a sufficient number of pixels capturing image data representative of the chart, such as for example 640×640 pixels), performing a 2D-FFT (Fast Fourier Transform) and producing a power spectrum, by taking the radial power part of the Real-FFT image, a KPI of the Texture Preservation (texture-MTF curve) can be produced when comparing or putting in a ratio by dividing it with the power spectrum of the original dead leaves image.

Figure 6A:
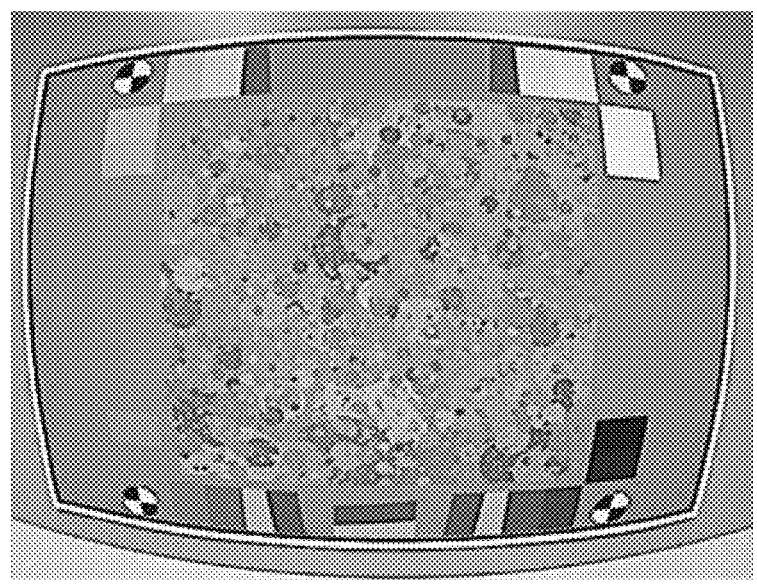
FIG. 6A is a captured image with comparably good texture preservation.
Figure 6B:
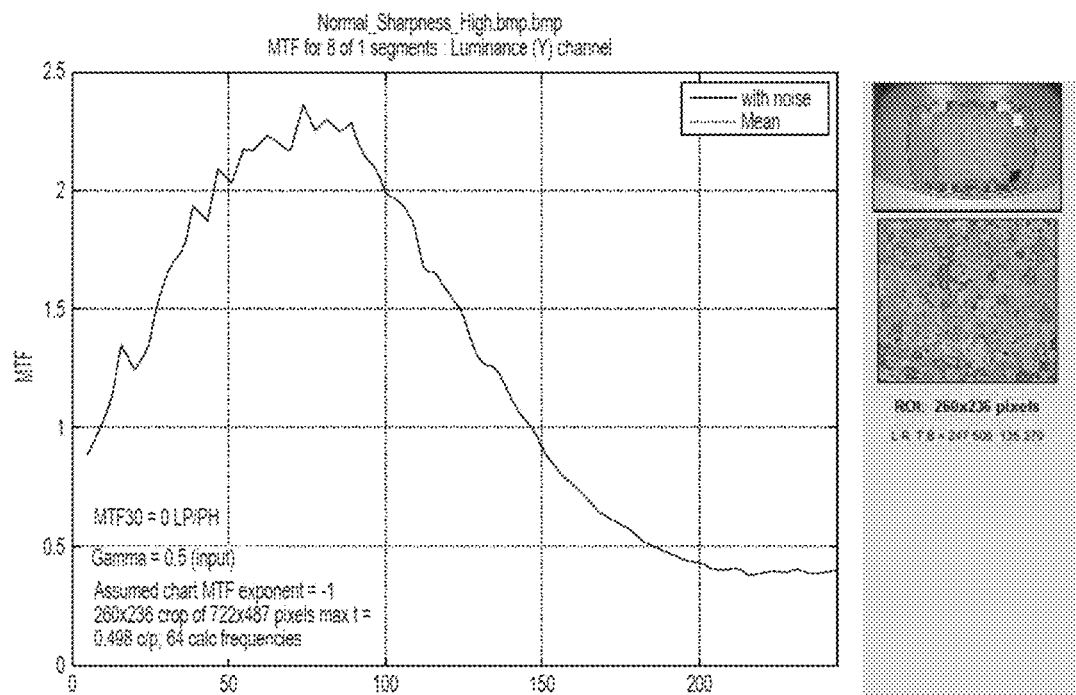
FIG. 6B is an MTF curve of the captured image of FIG. 6A.

In FIG. 6B, a MTF curve of a real captured image (FIG. 6A) of a camera with comparably good texture preservation is shown (capturing a 2D dead leaves image). In contrast to that, the MTF curve in FIG. 7B shows lacking in middle and high frequencies for images captured by a camera with comparably poorer texture preservation.

For human vision (video images captured by the camera(s) for display of video images on a display screen in the vehicle), the typical texture disappearance that is visible to the customer is in the size of borders of cobblestones on the ground, such as shown in the examples of FIGS. 2A and 2B. These borders would have a thickness typically between 1 and 4 pixels in medium distance of one to ten meters when using normal lens objectives or parameters. Texture in this frequency area also matters to machine vision (where image data is captured by the camera(s) for processing to detect objects or other characteristics present in the field of view of the camera or cameras), such as being used for environment object [surface] classification. Due to Nyquist-Shannon, when having maximal saturated pixels (white) in direct neighborhood of minimal saturated pixels (black), frequencies can be resolved that are no higher than double of the wavelengths of the pixel pitch as graphically shown in FIGS. 8A and 8B. In practice it has turned out that respective frequencies between $1/(2.5*pixel\ size)$ and $1/(5*pixel\ size)$ are good as measures for texture preservation.

Figure 9:
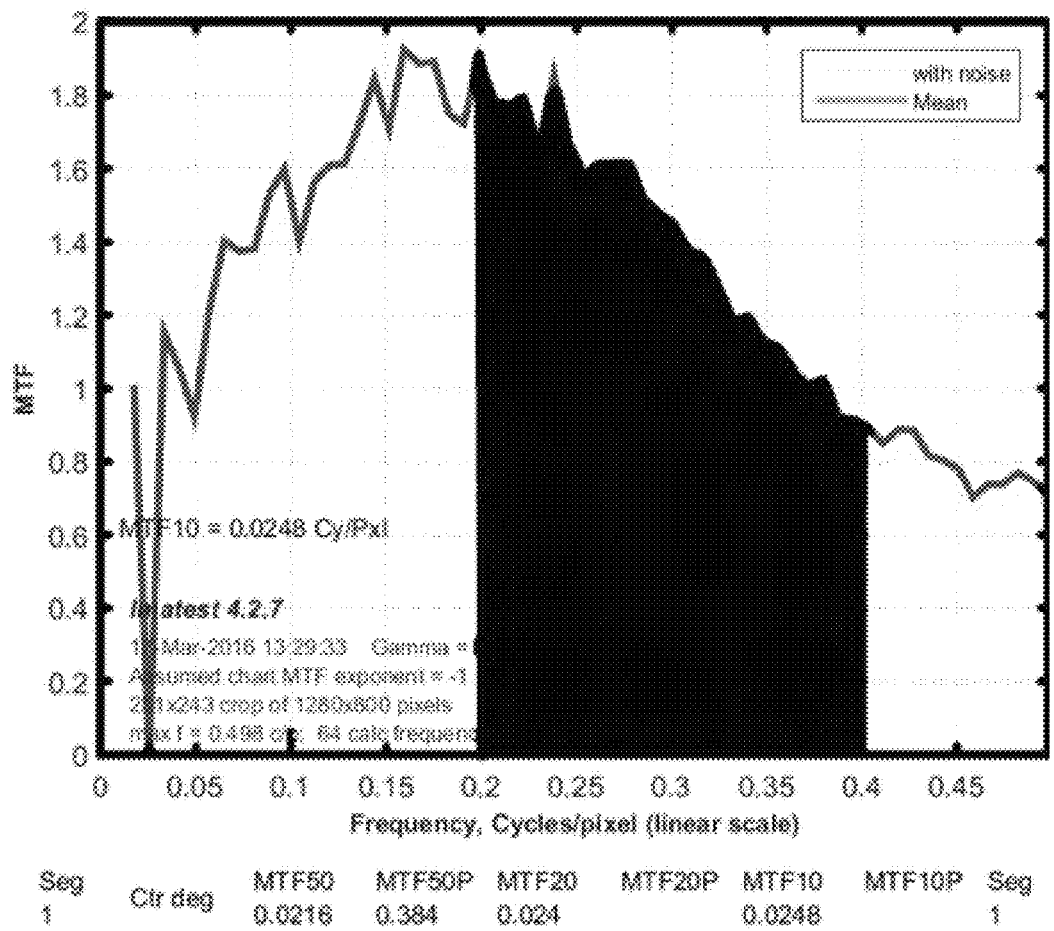
FIG. 9 is a graph showing use of an integral of the MTF power of frequencies between 1/(2,5*pixel size) and 1/(5*pixel size) as used as KPI for texture preservation.

In accordance with an aspect of the present invention, the integral of the MTF power of frequencies between $1/(2.5*pixel\ size)$ and $1/(5*pixel\ size)$ (or between 0.2 and 0.4 cycles per pixel) may be used as KPI for texture preservation, such as illustrated in FIG. 9.

As another aspect of the present invention, this KPI may be taken to optimize the camera imager system's register settings, especially HDR register settings for noise filtering in terms of texture preservation. This may be done in the following steps:

I. Try different register settings between maximum and minimum noise filtering;
II. Measure signal to noise;
III. Measure Texture KPI with the method described above; and
IV. Plot SNR and Texture KPI vs Noise filter strength and find the "sweet spot" (as a best compromise between remaining noise and texture preservation).

Figure 11:
FIG. 11 shows an image captured with register setting Peter from FIG. 10.
Figure 12:
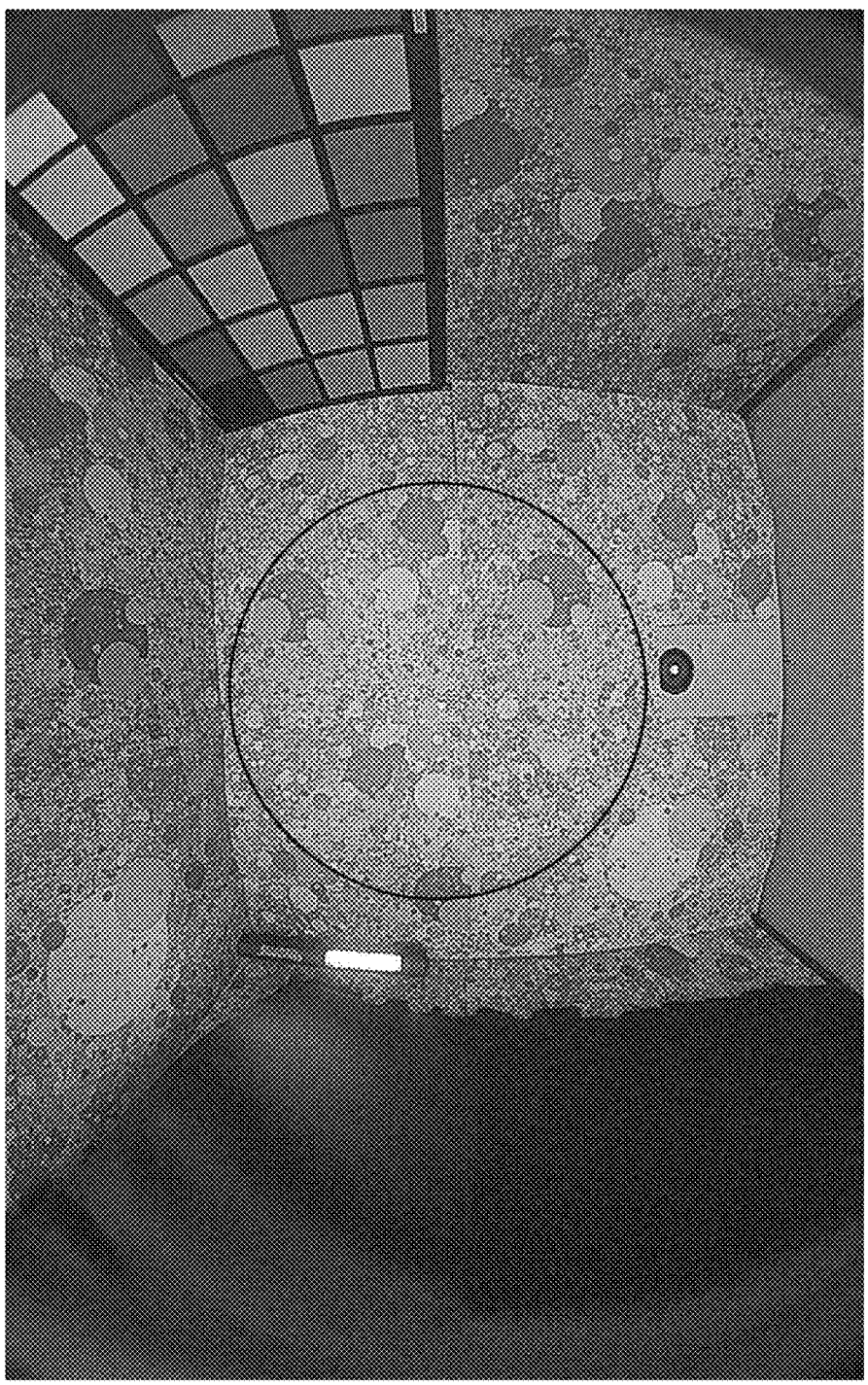
FIG. 12 shows an image captured with register setting Axel from FIG. 10.

FIG. 10 is an example of de-noising register settings which combinations have names. "Axel" has strong de-noising while with Peter the de-noising is off. In testing, two color images were taken in a test cubicle having very bright areas (lamp) and very dark areas (black curtain) with a fish eye lens camera using the register setting "Peter" (see FIG. 11) and "Axel" (see FIG. 12). The large circle in the center of both of FIGS. 11 and 12 is not part of the test pattern, but indicates the areas that are being compared. Also, without using frequency analysis KPIs, it is visible that features obviously present in the circle FIG. 12 have been lost when using the register setting of FIG. 11. With less extreme settings, the differences become less obvious to the human eye. Although present, some of the image noise is not as visible to the naked eye in FIGS. 11 and 12, since FIGS. 11 and 12 have been converted to dithering images.

Figure 13:
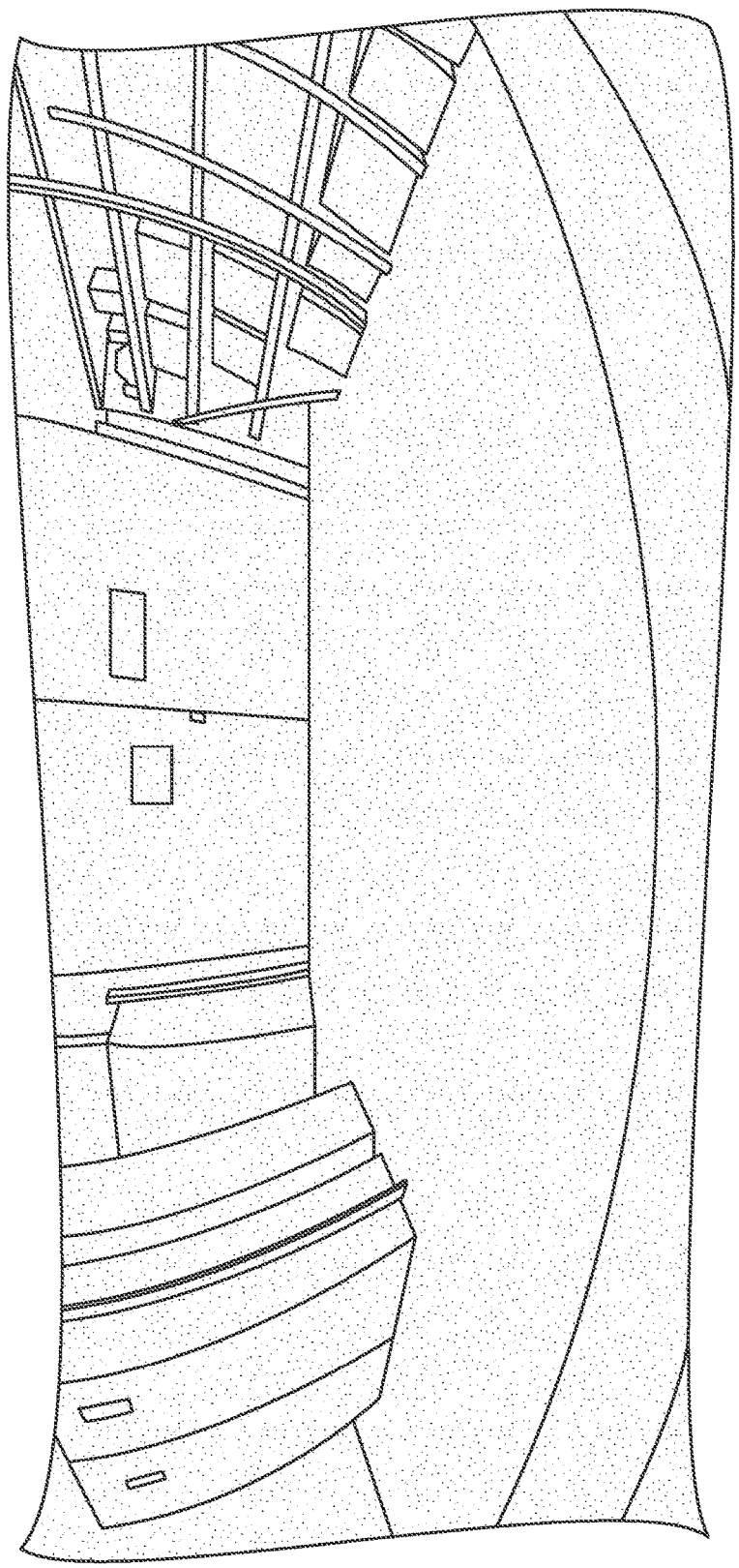
FIG. 13 shows an image captured in darker lighting conditions with register setting Peter from FIG. 10.
Figure 14:
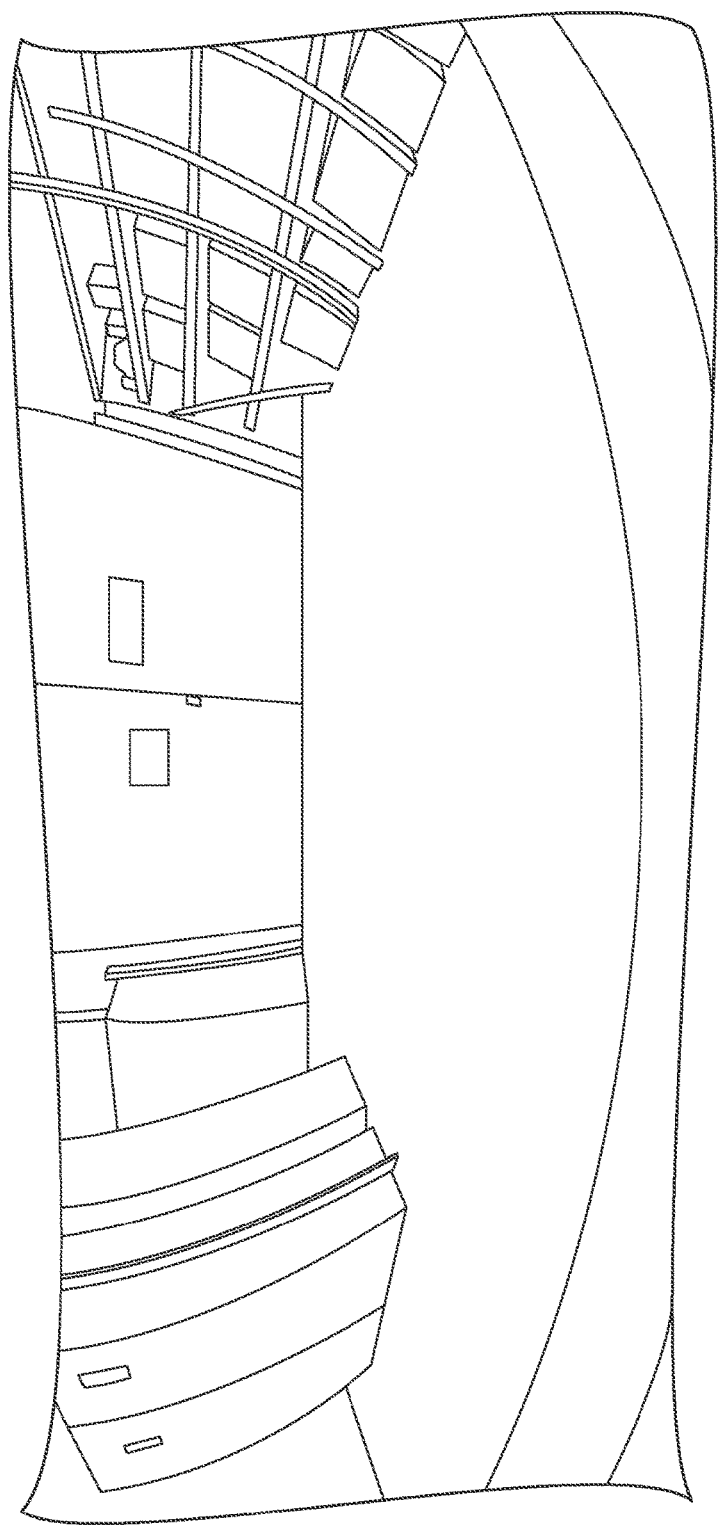
FIG. 14 shows an image captured in darker lighting conditions with register setting Ludwig from FIG. 10.
Figure 15:
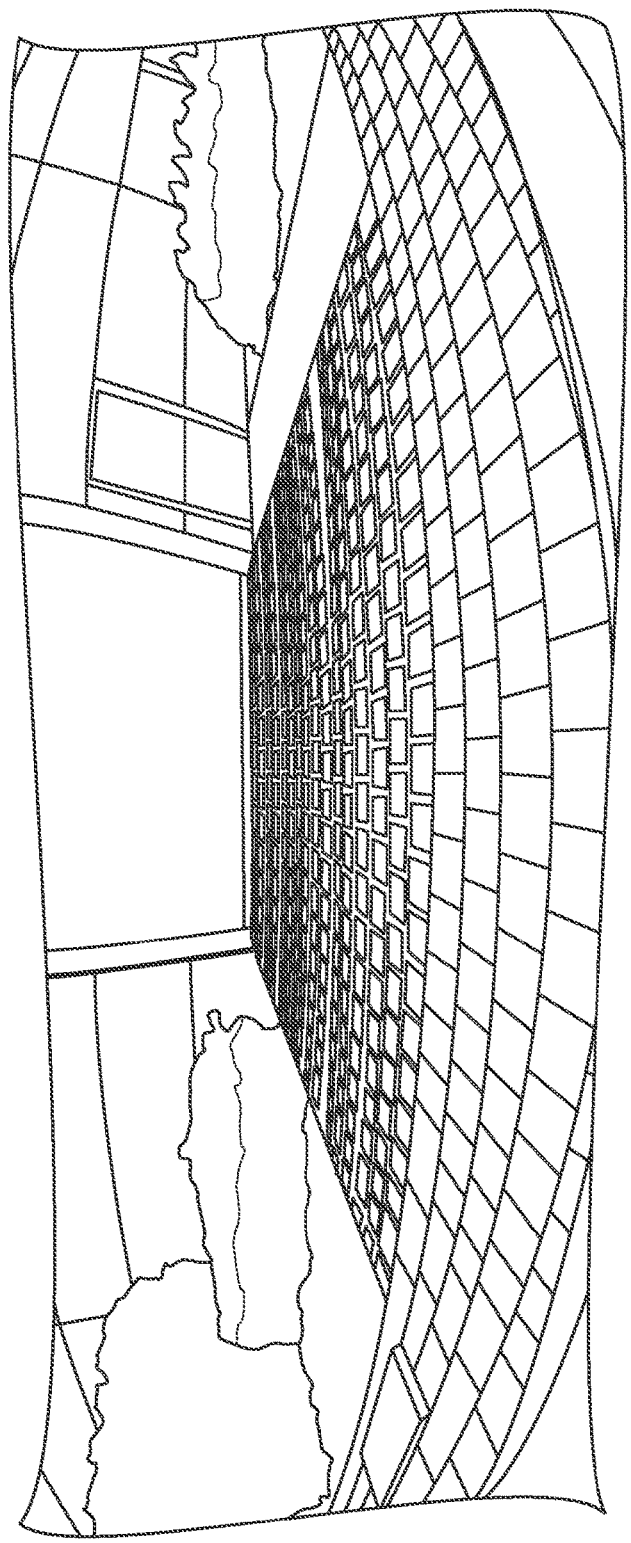
FIG. 15 shows an image captured with register setting Hugo from FIG. 10.
Figure 16:
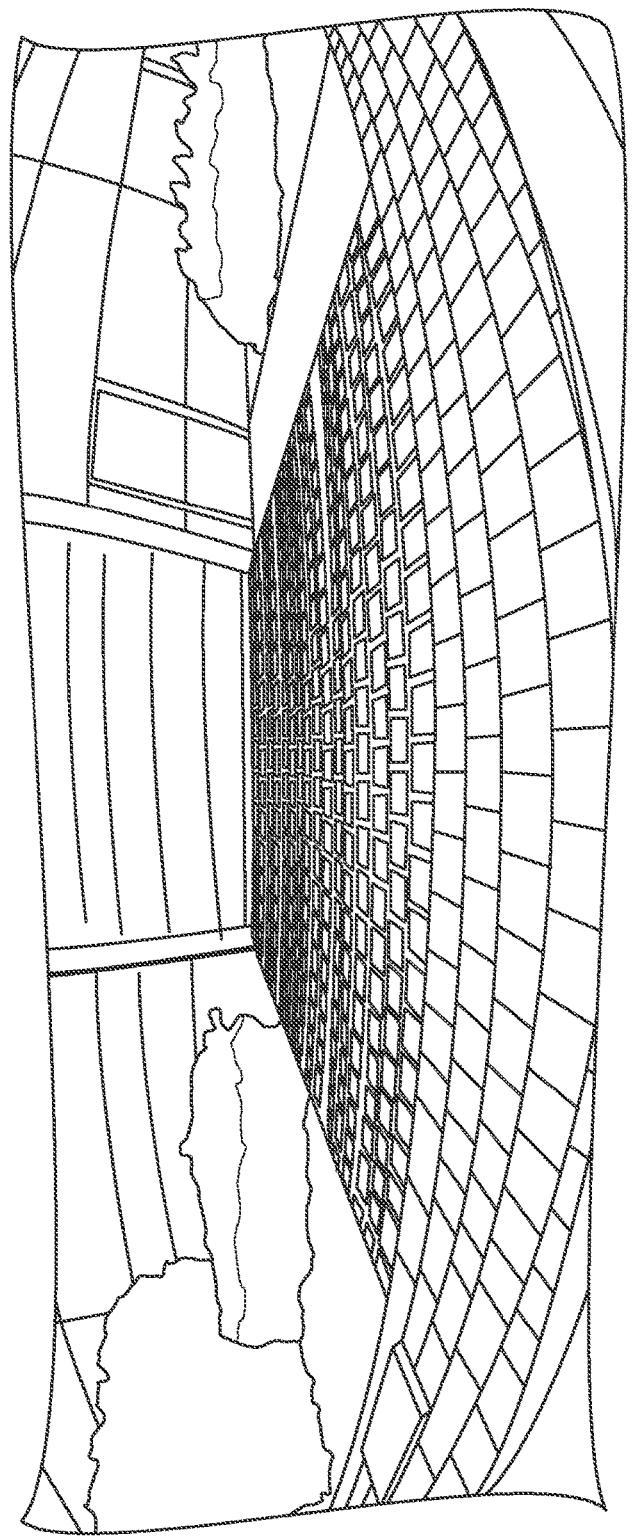
FIG. 16 shows an image captured with register setting Ludwig from FIG. 10.
Figure 17:
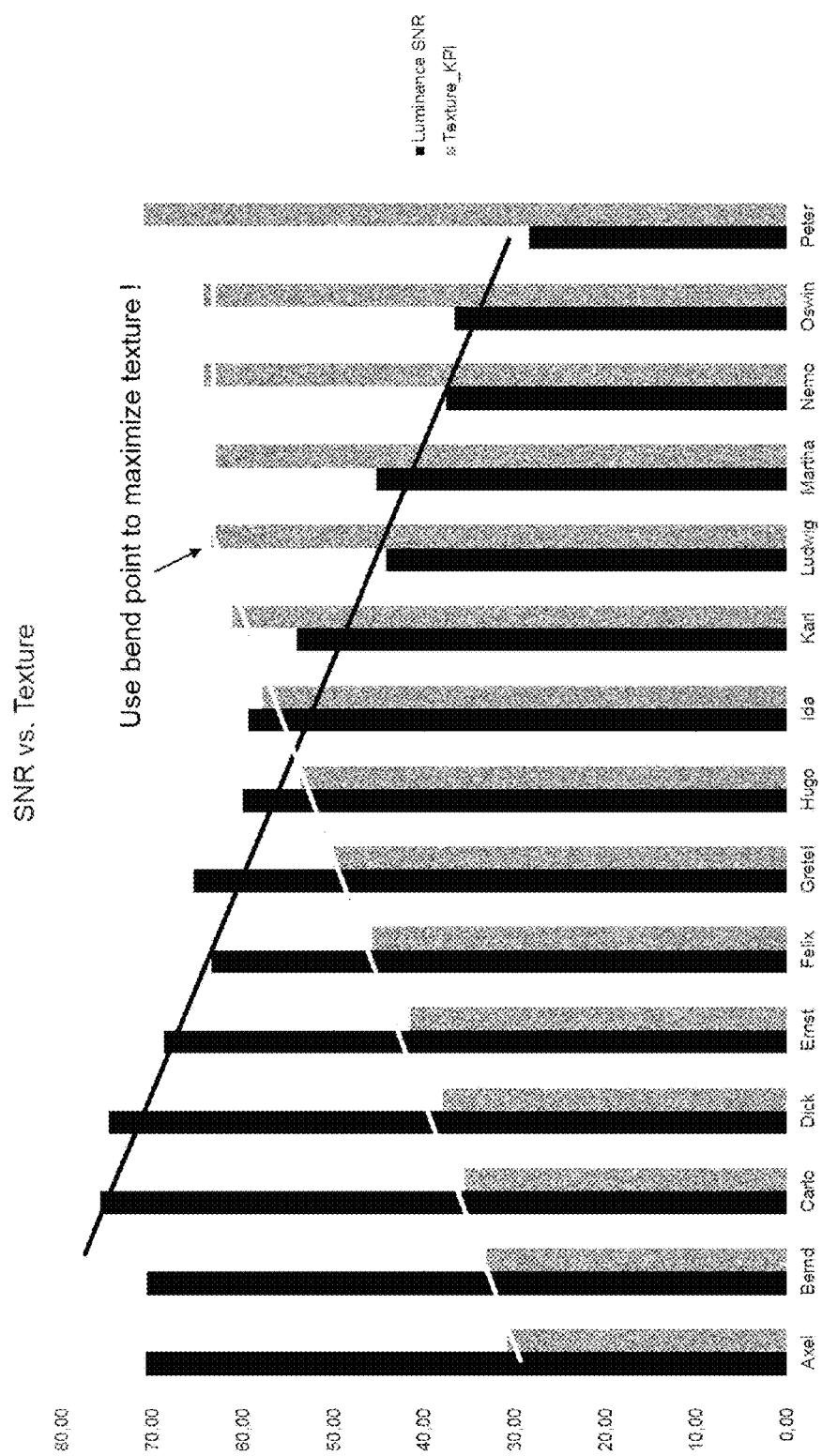
FIG. 17 is a graph showing the Luminance SNR versus the Texture KPI.

The image of FIG. 13 was taken in darker lighting conditions with the register setting "Peter" showing strong image noise, while the image of FIG. 14 was taken in the same conditions with the register settings "Ludwig". The noise suppression in FIG. 14 visibly improves the image noise. The image of FIG. 15 was captured by using register settings "Hugo" and the image of FIG. 16 was captured by using register settings "Ludwig." As can be seen by comparing FIG. 15 to FIG. 16, the captured images do not differ much in texture preservation and image noise visibly. FIG. 17 is a graph visualizing the Luminance SNR and the Texture KPI as being produced by steps I to IV above. It becomes clear that, until a certain point, the Texture KPI does not increase with diminishing noise filtering, shown as the indicated settle point in the graph. This is the sweet spot which should be chosen as a best compromise between image noise and texture preservation. For the tested camera of FIG. 17, the register setting Hugo or Ida would be selected, since those settings are closest to the intersection of the luminance SNR plot and the Texture KPI plot.

Figure 18:
FIGS. 18 and 19 are the same images as in FIGS. 11 and 12, showing that there are less differences in the region circled in FIGS. 18 and 19 that there are in the region circled in FIGS. 11 and 12.
Figure 19:

The measuring methods above used a cubicle measuring chamber splatted with the dead leaves pattern as shown in FIGS. 11 and 12. It may work well when using normal lens cameras. When using fish eye cameras, the patterns tailoring due to the fish eye lens optics and the angled surfaces of the test box against the camera have a falsifying effect. The circled patterns become more and more oval towards the edges and corner regions which results in an uneven frequency distribution. Another effect is the distance. The patterns in the center are closer to the camera than those in the corner regions. This is visible in the measured results. FIGS. 18 and 19 are identical to FIGS. 11 and 12, with the difference of the circles for the to-be-compared regions. In the circles in FIGS. 11 and 12, there are significant differences as compared to the circled areas of FIGS. 18 and 19, where the differences are less significant even though the pattern of the test box is the same.

Figure 20:
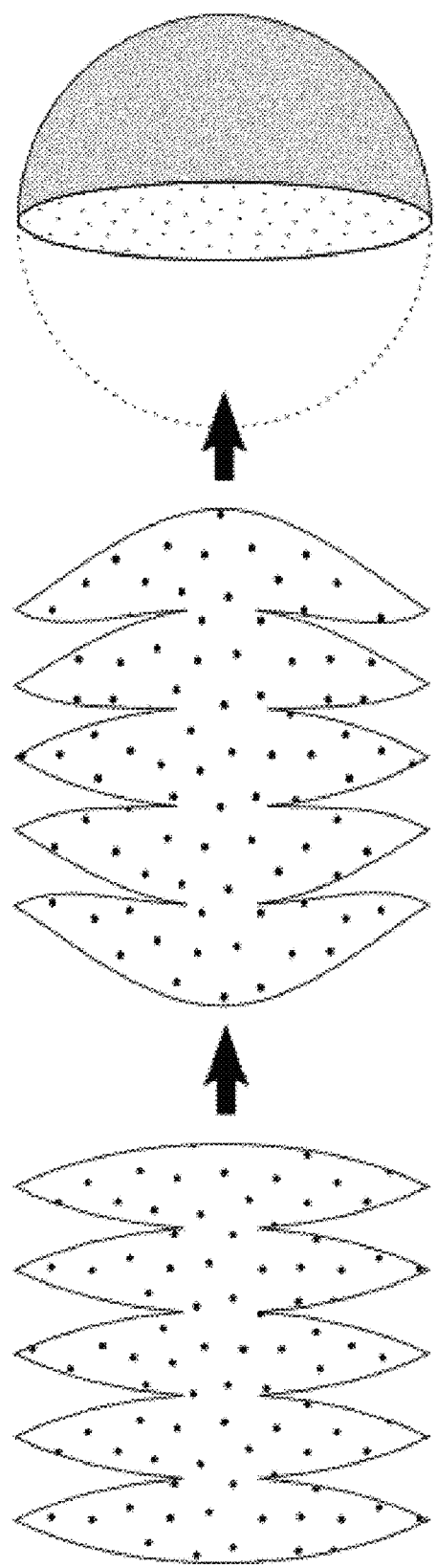
FIG. 20 is a schematic showing a test object having a spherical inside surface with the test pattern disposed on slides that may be stuck to the inside surface.
Figure 21:
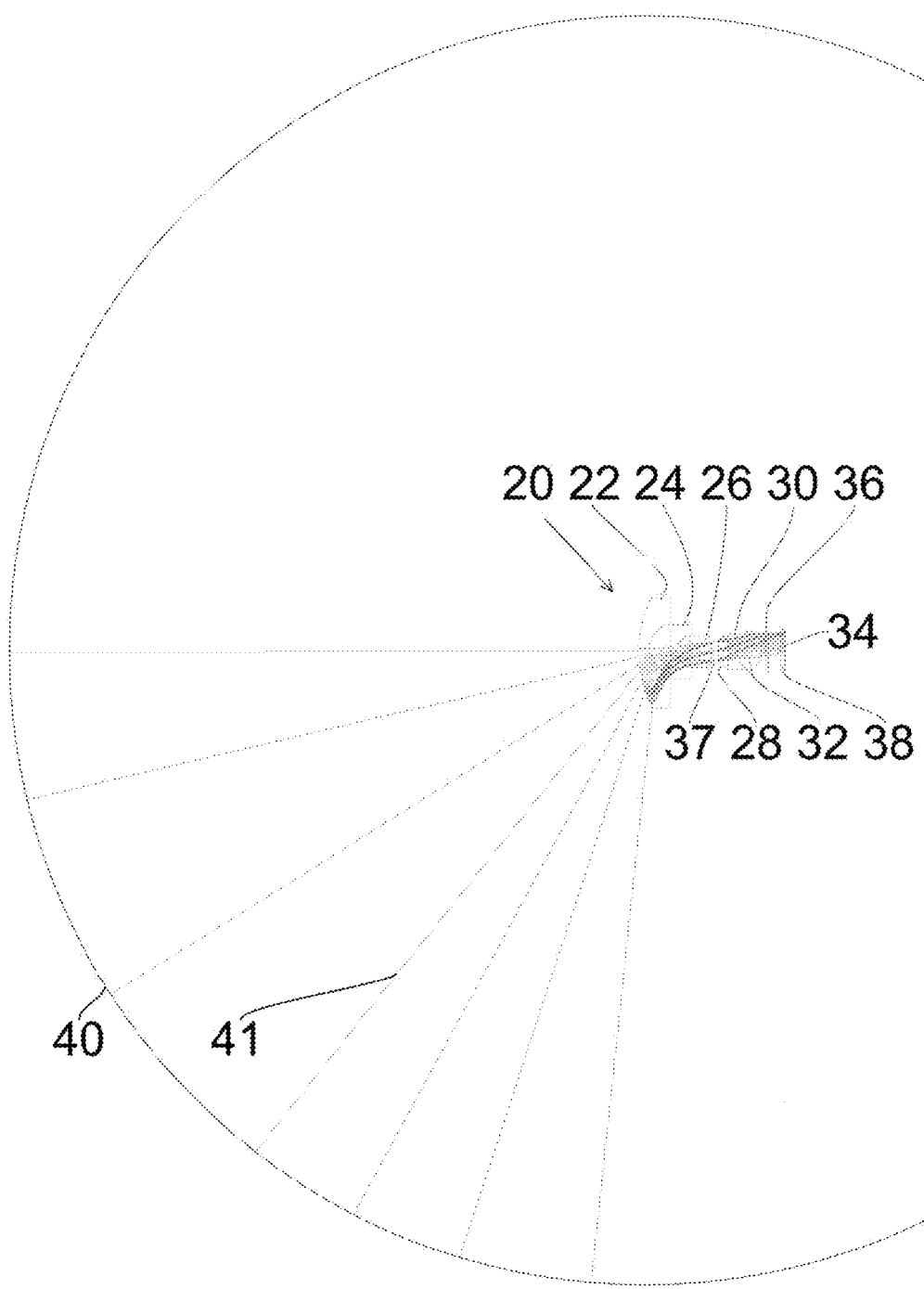
FIG. 21 is a schematic showing a fisheye camera under testing with a spherical test surface.

To enable the above specified, inventive Texture-KPI method for fish eye lens cameras, the test object wearing the test pattern may not be inside a cubicle but may be inside a sphere. Such an assembly may be done in a way such as shown in FIG. 20. The texture test pattern may be printed slides that may be stuck to the inside of a sphere. The sphere's surface may be orthogonal and equidistant to the intended to-be-tested camera optic's captured rays. FIG. 21 shows a fish eye camera under test in such a testing sphere. As shown in FIG. 21, a camera lens assembly 20 may include a wide angle optic 22, a second optic 24, a third optic 26, a fourth optic 28, a fifth optic 30, a sixth optic 32, an image sensor array 34, an infrared (IR) filter 36, an aperture 37, and a cover glass 38, with the camera viewing a test sphere's inner surface 40 and capturing image data representative of the light rays 41.

Figure 22:
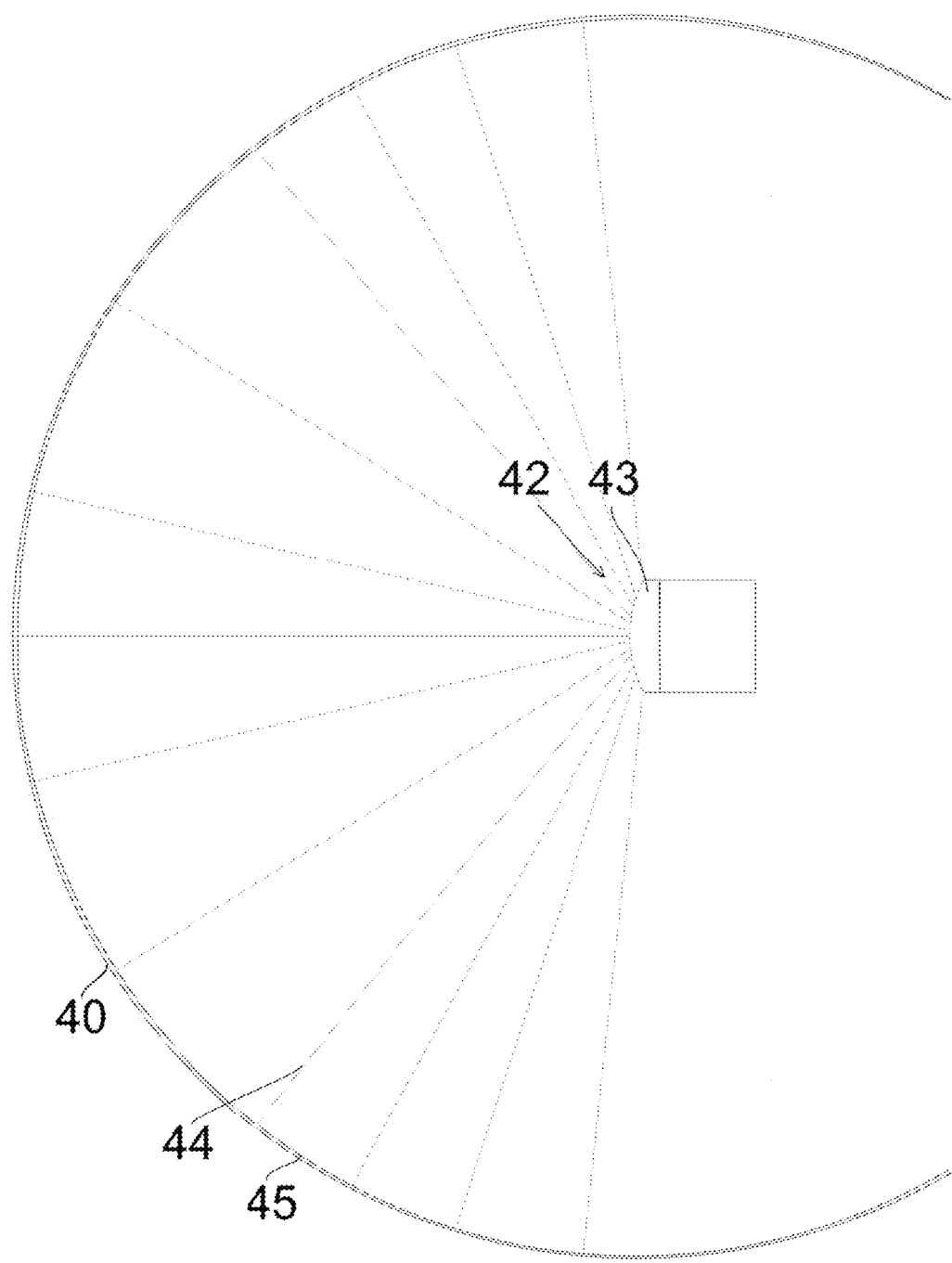
FIG. 22 is a schematic showing projection of a test pattern onto a spherical test surface.

In accordance with another aspect of the present invention (and such as shown in FIG. 22), instead of stuck pattern slides, the sphere inside 44 may be coated with a photo sensitive coating 45. For applying a test pattern, such as a dead leaves test pattern, the test pattern may be projected (projected rays 44, such as projected via a projection device 42 having projection device optics 43) onto the photo sensitive coating 45 and then developed for fixation. The projection may be done in a projection time suitable for the photo sensitive coatings sensitivity and the grain may be chosen in a way that the error produced by grain noise is insignificant, such as 1/100th of the smallest structure that can be resolved according the camera's lens system and pixel pitch intended for testing. Optionally, the projection may be done by a LASER projector, a slide projector, a DLP (Digital Light Processing) projector (using DMD (Digital Mirror Devices)) or projectors or structures light of any kind, such as a structured flash light. Optionally, an optical mask may be put on top of the photo sensitive coating. Optionally, the projecting optics 43 of the projection device 42 may be identical or nearly identical or may have close lens parameter to the intended to-be-tested camera fish eye lens optics 20, but used for projecting instead of being used for capturing light such as shown in FIG. 22.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or U.S. Pat. No. 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or U.S. Pat. No. 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or U.S. Pat. No. 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of testing a camera for vision system for a vehicle, said method comprising:
providing a camera configured for mounting and use on a vehicle, said camera having a field of view, wherein said camera is operable at selected ones of a plurality of register settings;
providing a test pattern in the field of view of the camera;
capturing image data with said camera;
wherein capturing image data comprises capturing at least two frames of image data using different register settings having noise filtering at a respective one of at least two levels between a maximum noise filtering and a minimum noise filtering;
measuring the signal to noise ratio for each of the at least two frames of captured image data;
measuring a texture value for each of the at least two frames of captured image data; and
selecting a compromise between noise reduction and texture preservation.

2. The method of claim 1, wherein selecting the compromise comprises plotting the measured signal to noise ratios and the measured texture values and selecting a register setting that is closest to an intersection of the plot of the measured signal to noise ratios and the measured texture values.

3. The method of claim 1, wherein measuring the texture value comprises determining a modulation transfer function for each of the at least two frames of captured image data.

4. The method of claim 3, wherein measuring the texture value comprises determining an integral of the modulation transfer function power of frequencies between $1/(2.5*\text{pixel size})$ and $1/(5*\text{pixel size})$.

5. The method of claim 3, wherein measuring the texture value comprises determining an integral of the modulation transfer function power of frequencies between 0.2 cycles per pixel and 0.4 cycles per pixel.

6. The method of claim 1, wherein the test pattern comprises a dead leaves test pattern.

7. The method of claim 1, wherein the test pattern is applied in a cubicle.

8. The method of claim 1, wherein the test pattern is applied in a sphere.

9. The method of claim 1, wherein the test pattern is projected onto a surface via a projector.

10. The method of claim 9, wherein the surface has photo sensitive coating disposed thereat.

11. The method of claim 1, wherein the test pattern is projected onto a partial spherical surface via a projector.

12. The method of claim 11, wherein the surface has photo sensitive coating disposed thereat.

13. The method of claim 1, wherein capturing image data comprises capturing at least five frames of image data using at least five respective register settings having noise filtering at a respective one of at least five levels between a maximum noise filtering and a minimum noise filtering.

14. The method of claim 13, wherein selecting the compromise comprises plotting the measured signal to noise ratios and the measured texture values and selecting a register setting that is closest to an intersection of the plot of the measured signal to noise ratios and the measured texture values.

15. A method of testing a camera for vision system for a vehicle, said method comprising:
   providing a camera configured for mounting and use on a vehicle, said camera having a field of view that encompasses a partial spherical surface, wherein said camera is operable at selected ones of a plurality of register settings;
   providing a test pattern in the field of view of the camera;
   wherein the test pattern is provided at the partial spherical surface;
   capturing image data with said camera;
   wherein capturing image data comprises capturing at least five frames of image data using different register settings having noise filtering at a respective one of at least five levels between a maximum noise filtering and a minimum noise filtering;
   measuring the signal to noise ratio for each of the at least five frames of captured image data;
   measuring a texture value for each of the at least five frames of captured image data; and
   selecting a compromise between noise reduction and texture preservation.

16. The method of claim 15, wherein the test pattern comprises a dead leaves test pattern.

17. The method of claim 15, wherein the partial spherical surface has photo sensitive coating disposed thereat.

18. The method of claim 17, wherein the test pattern is projected onto the partial spherical surface via a projector.

19. A method of testing a camera for vision system for a vehicle, said method comprising:
   providing a camera configured for mounting and use on a vehicle, said camera having a field of view, wherein said camera is operable at selected ones of a plurality of register settings;
   providing a test pattern in the field of view of the camera;
   capturing image data with said camera;
   wherein capturing image data comprises capturing at least five frames of image data using different register settings having noise filtering at a respective one of at least five levels between a maximum noise filtering and a minimum noise filtering;
   measuring the signal to noise ratio for each of the at least five frames of captured image data;
   measuring a texture value for each of the at least five frames of captured image data;
   plotting the measured signal to noise ratios and the measured texture values; and
   selecting a register setting that is closest to an intersection of the plot of the measured signal to noise ratios and the measured texture values.

20. The method of claim 19, wherein measuring the texture value comprises determining a modulation transfer function for each of the at least five frames of captured image data, and wherein measuring the texture value or each of the at least five frames of captured image data comprises (i) determining an integral of the modulation transfer function power of frequencies between 1/(2.5*pixel size) and 1/(5*pixel size), or (ii) determining an integral of the modulation transfer function power of frequencies between 0.2 cycles per pixel and 0.4 cycles per pixel.

* * * * *